(12) United States Patent
Yuan et al.

(10) Patent No.: US 11,529,220 B2
(45) Date of Patent: Dec. 20, 2022

(54) PORTABLE TEETH CLEANING APPARATUS

(71) Applicant: XIAMEN JIEBOYA TECHNOLOGY CO,LTD., Fujian (CN)

(72) Inventors: Mu Yuan, Fujian (CN); Caibo Gu, Fujian (CN)

(73) Assignee: XIAMEN JIEBOYA TECHNOLOGY CO, LTD., Fujian (CN)

(*) Notice: Subject to any disclaimer, the term of this patent is extended or adjusted under 35 U.S.C. 154(b) by 925 days.

(21) Appl. No.: 16/378,585

(22) Filed: Apr. 9, 2019

(65) Prior Publication Data
US 2020/0214814 A1    Jul. 9, 2020

(30) Foreign Application Priority Data
Jan. 3, 2019  (CN) .......................... 201910004725.0

(51) Int. Cl.
| | | |
|---|---|---|
| A61C 17/02 | (2006.01) | |
| A61C 1/00 | (2006.01) | |
| A61C 15/00 | (2006.01) | |
| A61C 17/022 | (2006.01) | |
| A61H 13/00 | (2006.01) | |

(52) U.S. Cl.
CPC ........ *A61C 17/0202* (2013.01); *A61C 1/0015* (2013.01); *A61C 1/0092* (2013.01); *A61C 15/00* (2013.01); *A61C 17/022* (2013.01); *A61C 17/0217* (2013.01); *A61H 13/005* (2013.01)

(58) Field of Classification Search
CPC . A61C 17/0202; A61C 17/0205; A61C 17/02; A61C 17/024; A61C 17/028
USPC .................................................. 601/162, 165
See application file for complete search history.

(56) References Cited

U.S. PATENT DOCUMENTS

| | | | | |
|---|---|---|---|---|
| 4,509,507 A | * | 4/1985 | Yabe ................. | A61B 1/00068 604/27 |
| 5,634,791 A | * | 6/1997 | Matsuura ........... | A61C 17/0202 433/88 |
| 2009/0070949 A1 | * | 3/2009 | Sagel ................. | A46B 11/0058 15/28 |
| 2016/0331497 A1 | * | 11/2016 | Follows .............. | A61C 17/221 |

* cited by examiner

*Primary Examiner* — Cris L. Rodriguez
*Assistant Examiner* — Sydney J Pulvidente
(74) *Attorney, Agent, or Firm* — JCIP Global Inc.

(57) ABSTRACT

Disclosed is a portable teeth cleaning apparatus, which implements, through a pump in a teeth cleaner, a function of supplementing a teeth cleaning liquid from a connecting seat connected to the teeth cleaner. Therefore, it is no longer necessary to connect the teeth cleaner to a teeth cleaning liquid source through a connecting hose during teeth cleaning, and liquid leakage is avoided during liquid supplement. Further, a seating/unseating status and whether a liquid reservoir is filled up are detected automatically, and a controller controls on/off and switching of a series of valves, thereby implementing automatic liquid supplement of the teeth cleaner.

13 Claims, 3 Drawing Sheets

PORTABLE TEETH CLEANING APPARATUS

CROSS-REFERENCE TO RELATED APPLICATION

This application claims the priority benefit of China application serial no. 201910004725.0, filed on Jan. 3, 2019. The entirety of the above-mentioned patent application is hereby incorporated by reference herein and made a part of this specification.

BACKGROUND OF THE INVENTION

1. Field of the Invention

This application relates to the field of personal hygiene care, and more specifically, to a portable teeth cleaning apparatus.

2. Description of Related Art

It is known that teeth cleaning apparatuses generally can be classified into two types. A first type of teeth cleaning apparatus mainly includes a water tank, a pump, and a teeth cleaner. During teeth cleaning, the pump transmits water in the water tank to an ejector of the teeth cleaner. A teeth cleaner in a second type of teeth cleaning apparatus includes a built-in water reservoir, and the teeth cleaner includes a water pump. During teeth cleaning, water in the water reservoir is transmitted to an ejector through the water pump. Defects in the first type of teeth cleaning apparatus are mainly that the teeth cleaner needs to be connected to the water tank and the pump through connecting hoses all the time. Therefore, poses in which a user holds the teeth cleaner are restricted, resulting in inconvenience in the teeth cleaning process and causing that the connecting hoses further need to be stored after teeth cleaning is finished. Defects in the second type of teeth cleaning apparatus is that it is inconvenient to inject water into the water reservoir; water needs to be injected each time after the apparatus is used. Because a water injection port is usually small, water leaks easily during water injection, causing a waste of water.

SUMMARY OF THE INVENTION

The following is a summary of the subject that is described in detail in this text. The summary is not intended to limit the protection scope of the claims.

This application provides a portable teeth cleaning apparatus, which not only can avoid inconvenience caused by connecting hoses during teeth cleaning, but also avoids water leakage during water injection. Further, the portable teeth cleaning apparatus can implement automatic water injection.

An embodiment of this application relates to a portable teeth cleaning apparatus, including a teeth cleaner and a connecting seat. The teeth cleaner includes a liquid reservoir and a teeth cleaner body fixedly connected to each other. The liquid reservoir includes a liquid reservoir body, a connector, and a changeover valve. The liquid reservoir body is provided with a check valve, and the check valve is opened during liquid supplement for the liquid reservoir. The connector is provided with an outlet, an air suction port, and a liquid suction port. The outlet extends out of the liquid reservoir body, the air suction port is provided at an upper portion of an inner cavity of the liquid reservoir body, and the liquid suction port is provided at a lower portion of the inner cavity of the liquid reservoir body. The changeover valve is used for enabling the outlet to be in communication with the air suction port or the liquid suction port alternatively. The teeth cleaner body includes a pump, an ejector, and a battery. One end of the pump is in communication with the outlet and the other end of the pump is in communication with the ejector. During teeth cleaning, the pump sucks a teeth cleaning liquid in the liquid reservoir and transmits the teeth cleaning liquid to the ejector. During liquid supplement for the liquid reservoir, the pump forms a negative pressure in the inner cavity of the liquid reservoir body. The battery supplies power to the changeover valve and the pump. The connecting seat allows the teeth cleaner to be seated or unseated, and is provided with a liquid supply channel. The liquid supply channel is adapted to be in communication with the liquid supply source. When the teeth cleaner is seated, the liquid supply channel is in communication with the inner cavity of the liquid reservoir body through the check valve.

It can be learned from the foregoing description about the present invention that, compared with the prior art, the present invention has the following beneficial effects:

1. The pump forms a negative pressure in the inner cavity of the liquid reservoir body during liquid supplement for the liquid reservoir, and the liquid supply channel of the connecting seat is in communication with the inner cavity of the liquid reservoir body through the check valve. Therefore, after the teeth cleaner is seated, the negative pressure is formed in the inner cavity of the liquid reservoir body, so that the liquid in the liquid reservoir can be supplemented, and liquid leakage can be avoided during liquid injection. On the other hand, the liquid reservoir is fixedly connected to the teeth cleaner body, and the teeth cleaning liquid in the liquid reservoir is transmitted through the pump during teeth cleaning. Therefore, the liquid reservoir does not need to be connected to a teeth cleaning liquid source through a connecting hose.

2. By disposing a sensing valve, the liquid supply channel can be cut off when the teeth cleaner is unseated, so that a manually operated valve does not need to be disposed on the connecting seat.

3. The teeth cleaner is charged through a charging terminal or a wireless charging terminal on the connecting seat, so that liquid supplement and charging can be performed at the same time, and the teeth cleaner does not need to be charged additionally.

4. By disposing a first sensor and a second sensor, a controller can identify whether the teeth cleaner is seated and whether the teeth cleaner is fully filled with the teeth cleaning liquid, so that automatic liquid supplement after seating of the teeth cleaner and auto-off after liquid supplement can be implemented.

5. By disposing a pressure sensor, the first sensor and the second sensor are integrated, thereby helping reduce costs and the weight of the teeth cleaner.

6. By providing an air inlet channel, air can enter the inner cavity of the liquid reservoir body when the teeth cleaner is used to clean teeth, so that the teeth cleaning liquid is ejected more easily.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and a person of ordinary skill in the art may still derive other drawings from these accompanying drawings without creative efforts.

DESCRIPTION OF THE EMBODIMENTS

The technical solutions in the embodiments of the present invention are described in the following with reference to the accompanying drawings in the embodiments of the present invention.

Figure 1:
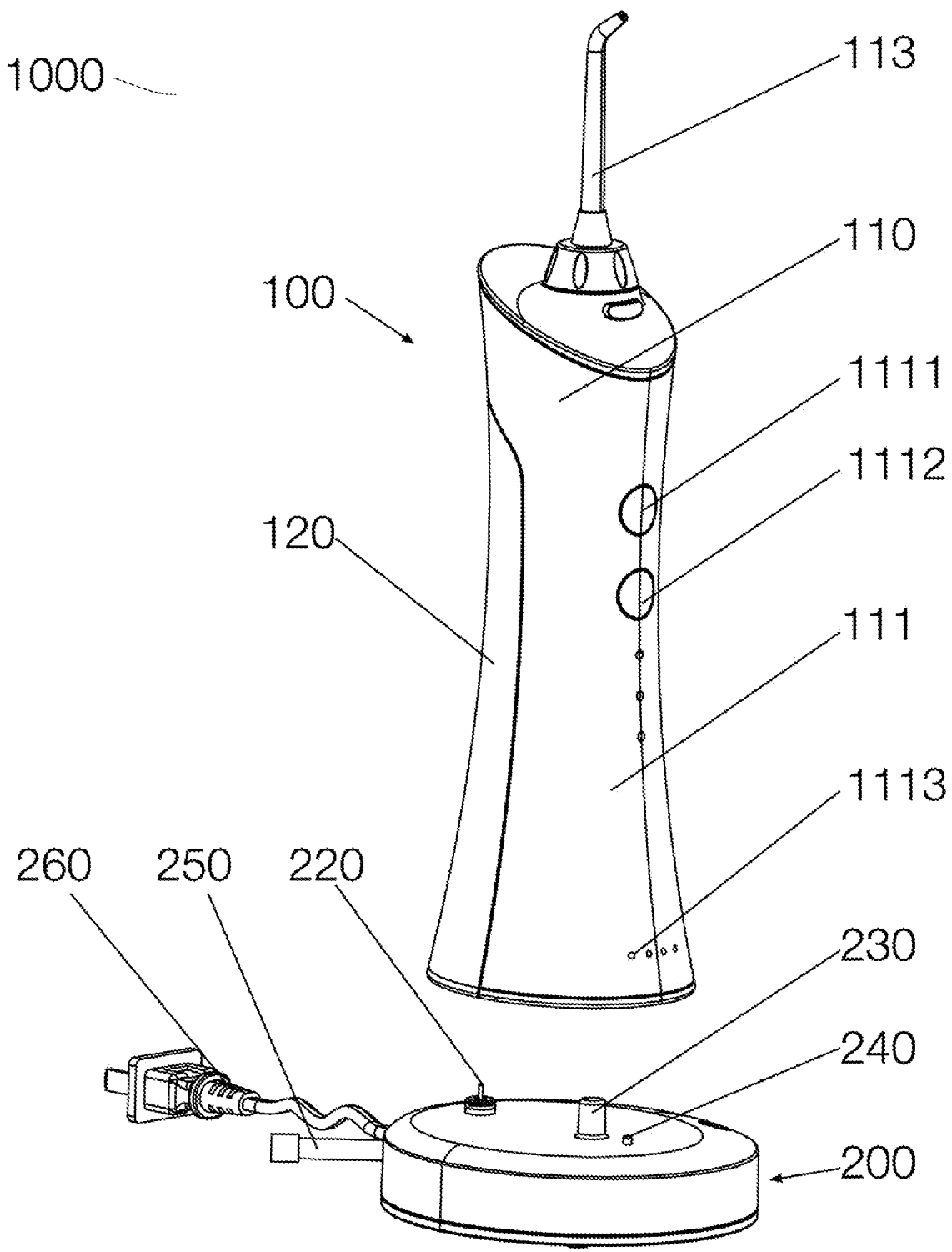
FIG. 1 is a three-dimensional diagram of an embodiment.
Figure 2:
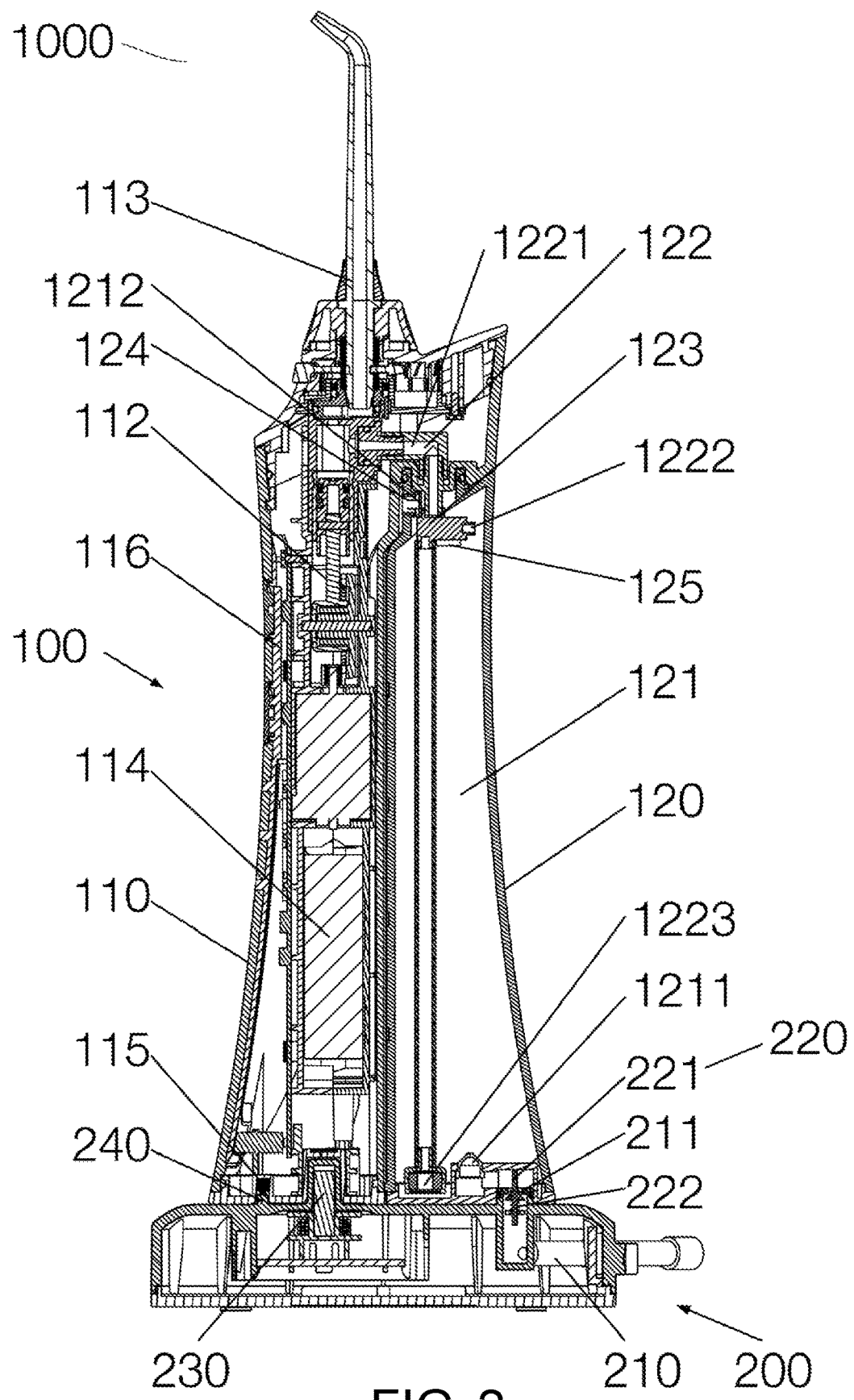
FIG. 2 is a structural diagram of the embodiment.

Referring to FIG. 1 and FIG. 2, FIG. 1 and FIG. 2 show a portable teeth cleaning apparatus 1000 according to the present embodiment. As shown in FIG. 1 and FIG. 2, in the present embodiment, the portable teeth cleaning apparatus 1000 includes a teeth cleaner 100 and a connecting seat 200.

The teeth cleaner 100 includes a teeth cleaner body 110 and a liquid reservoir 120 fixedly connected to each other. Generally, the liquid reservoir 120 may be detachably and fixedly connected on a backside of the teeth cleaner body 110 in a clamping manner, and may be connected thereto in a non-detachable manner. The liquid reservoir 120 may even be integrally formed with the teeth cleaner body 110. In the present embodiment, the teeth cleaner body 110 and the liquid reservoir 120 are fixedly connected in a non-detachable manner, and form a substantially cylindrical shape easy to handle. The fixed connection manner between the liquid reservoir 120 and the teeth cleaner body 110 is the existing technology.

The liquid reservoir 120 includes a liquid reservoir body 121, a connector 122, a changeover valve 123, an electric control valve 124, and a second sensor 125.

The liquid reservoir body 121 is a closed container provided with an inner cavity, and is provided with a check valve 1211 at a bottom portion thereof. In the present embodiment, the check valve 1211 is configured as a duckbill valve, and is set to open automatically in a single direction from an exterior to an interior, so that during liquid supplement for the liquid reservoir, a liquid can enter the inner cavity of the liquid reservoir body 121 through the check valve 1211. An air inlet channel 1212 for communicating the atmosphere and the inner cavity of the liquid reservoir body 121 is further provided at an upper portion of the liquid reservoir body 121. Generally, the air inlet channel 1212 has a small diameter, for example, 0.5 mm, so that air can enter the inner cavity of the liquid reservoir body 121 easily while it is difficult for a teeth cleaning liquid to leak out of the inner cavity of the liquid reservoir body 121. By providing the air inlet channel 1212, air can enter the inner cavity of the liquid reservoir body 121 when the teeth cleaner is used to clean teeth, so that the teeth cleaning liquid is ejected more easily.

The connector 122 is provided with an outlet 1221, an air suction port 1222, and a liquid suction port 1223. The outlet 1221 extends out of the liquid reservoir body 121. The air suction port 1222 is provided at an upper portion of the inner cavity of the liquid reservoir body 121. The liquid suction port 1223 is provided at a lower portion of the inner cavity of the liquid reservoir body 121, so that the teeth cleaning liquid can still be sucked through the liquid suction port 1223 even when there is only a small amount of the teeth cleaning liquid. The connector 122 is connected to the liquid reservoir body 121 in a sealed manner.

The changeover valve 123 is used for enabling the outlet 1221 of the connector to be in communication with the air suction port 1222 or the liquid suction port 1223 alternatively. In other words, the changeover valve 123 is switched between two states. In a first state, the changeover valve 123 enables the outlet 1221 to be in communication with the air suction port 1222 without being in communication with the liquid suction port 1223. In a second state, the changeover valve 123 enables the outlet 1221 to be in communication with the liquid suction port 1223 without being in communication with the air suction port 1222. In the present embodiment, the changeover valve 123 is electrically controlled. Definitely, such an electrically controlled changeover valve is also the existing technology, and is widely applied in the field.

The electric control valve 124 is used for opening and closing the air inlet channel 1212. Such an electric control valve is also the existing technology. It should be noted that, in the present embodiment, when closing the electric control valve 124, the air inlet channel 1212 needs to be air-tight, that is, air cannot enter the inner cavity of the liquid reservoir body 121 through the air inlet channel 1212.

The second sensor 125 is a liquid level sensor. In the present embodiment, the second sensor 125 is disposed in the inner cavity of the liquid reservoir body 121 and used for sensing whether the liquid reservoir body 121 is fully filled with the teeth cleaning liquid. In the existing technology, the second sensor 125 may also be a capacitive sensor that is attached to an external wall of the liquid reservoir body 121 to determine a liquid level in the liquid reservoir body 121.

The teeth cleaner body 110 includes a housing 111, a pump 112, an ejector 113, a battery 114, a first sensor 115, and a controller 116.

The housing 111 covers the pump 112, the ejector 113, the battery 114, the first sensor 115, and the controller 116. The housing 111 is provided with a teeth cleaning button 1111, a stop button 1112, and a battery level indicator light 1113. The teeth cleaning button 1111 is used for controlling the teeth cleaner to enter a teeth cleaning state. The stop button 1112 is used for controlling the teeth cleaner to exit the teeth cleaning state. The battery level indicator light 1113 is used for displaying a remaining capacity of the battery 114.

One end of the pump 112 is in communication with the outlet 1221 of the connector 122 and the other end of the pump 112 is in communication with the ejector 113. When the teeth cleaner enters the teeth cleaning state, the pump 112 sucks the teeth cleaning liquid in the liquid reservoir 120 and transmits the teeth cleaning liquid to the ejector 113. When the teeth cleaner enters a liquid supplement state for the liquid reservoir, the pump 112 sucks air from the outlet 1221 to the ejector 113, so that a negative pressure is formed in the inner cavity of the liquid reservoir body 121, to facilitate supplement of the teeth cleaning liquid in the inner cavity of the liquid reservoir body 121.

Figure 3:
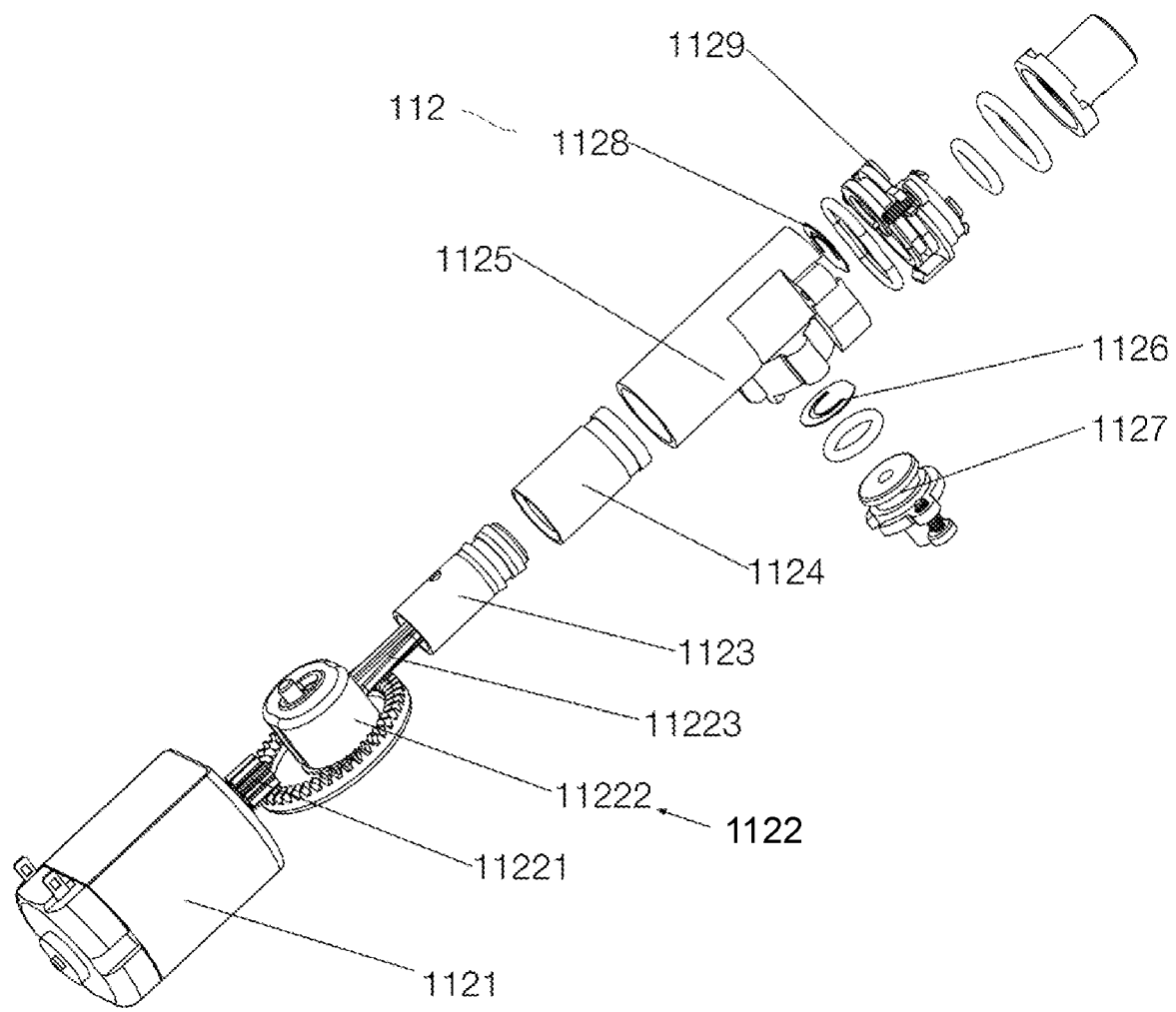
FIG. 3 is an exploded diagram of a pump in the embodiment.

A specific structure of the pump 112 is shown in FIG. 3. As shown in FIG. 3, the pump 112 includes a rotary motor 1121, a transmission mechanism 1122, a piston 1123, a piston sleeve 1124, a pump body 1125, a first check valve plate 1126, a first connecting seat 1127, a second check valve plate 1128, and a second connecting seat 1129. The transmission mechanism 1122 further includes a cylindrical gear element 11221, a bevel gear element 11222, and a connecting rod 11223. The rotary motor 1121 drives the cylindrical gear element 11221 to rotate, and the cylindrical gear element 11221 is engaged with the bevel gear element 11222, thereby driving the bevel gear element 11222 to rotate. One end of the connecting rod 11223 is hingedly connected to the bevel gear element 11222 in an eccentric manner, and the other end of the connecting rod 11223 is hingedly connected to the piston 1123, thereby forming a crank-connecting rod mechanism, so that the rotation of the bevel gear element 11222 drives the piston 1123 to move linearly in the piston sleeve 1124. The piston sleeve 1124 is disposed in the pump body 1125. The pump body 1125 is further provided with an inlet and an outlet, the inlet being connected to the first connecting seat 1127 through the first check valve plate 1126, and the outlet being connected to the second connecting seat 1129 through the second check valve plate 1128. The first check valve plate 1126 only allows gas or liquid to flow from the first connecting seat 1127 into the pump body 1125, and does not allow gas or liquid to flow from the pump body 1125 to the first connecting seat 1127. The second check valve plate 1128 only allows gas or liquid to flow out from the pump body 1125 to the second connecting seat 1129, and does not allow gas or liquid to flow from the second connecting seat 1129 into the pump body 1125. In the present embodiment, the first connecting seat 1127 is adapted to be connected to the outlet 1221 of the connector 122, and the second connecting seat 1129 is adapted to be connected to the ejector 113. Therefore, liquid or gas can be continuously transmitted from the outlet 1221 to the ejector 113.

In the present embodiment, the ejector 113 is an elongated and tubular object, and is provided with a small hole at a top end thereof to eject the teeth cleaning liquid with a thin-thread shape, so as to clean teeth or gaps between teeth conveniently.

In the present embodiment, the battery 114 is a rechargeable battery. The battery 114 supplies power to the pump 112, the first sensor 115, the controller 116, the changeover valve 123, and the electric control valve 124. In the present embodiment, because the liquid reservoir 120 and the teeth cleaner body 110 are fixedly connected in a non-detachable manner, it is easy to build electrical connection between the changeover valve 123 as well as the electric control valve 124 and the battery 114 as well as the controller 116. If the liquid reservoir 120 and the teeth cleaner body 110 need to be fixedly connected in a detachable manner, a first contact point electrically connected to the battery 114 and the controller 116 needs to be disposed on the teeth cleaner body 110, a second contact point electrically connected to the changeover valve 123 and the electric control valve 124 needs to be disposed on the liquid reservoir 120, and the first contact is electrically connected to the second contact after the teeth cleaner body 110 and the liquid reservoir 120 are connected.

The first sensor 115 is used for sensing seating or unseating of the teeth cleaner 100, and sending a sensing result to the controller 116. In the present embodiment, the first sensor 115 is a limit switch disposed at a bottom surface of the teeth cleaner body 110, and includes a vertically disposed slide bar and a trigger located at an upper portion of the slide bar. When the teeth cleaner 100 is seated, the connecting seat 200 abuts against the slide bar, so that the slide bar touches the trigger to send a seating signal. When the teeth cleaner 100 is unseated, the slide bar leaves the trigger to send an unseating signal. In the present embodiment, the connecting seat 200 is further provided with a projection 240 for abutting against the slide bar. Such an arrangement achieves the following advantage: If the teeth cleaner 100 is placed on a plane (such as a surface of the wash basin), the plane cannot abut against the slide bar, and therefore the first sensor 115 cannot send a seating signal; the projection 240 abuts against the slide bar only when the teeth cleaner 100 is seated on the connecting seat 200, so that the slide bar touches the trigger to send a seating signal.

The controller 116 is used for receiving a teeth cleaning instruction sent by the teeth cleaning button 1111 and a stop instruction sent by the stop button 1112, and also used for receiving the seating signal or the unseating signal from the first sensor 115 and a fully-filled signal or an incompletely-filled signal from the second sensor 125. When the first sensor 115 sends a seating signal and the second sensor 125 sends an incompletely-filled signal, the controller 116 controls the changeover valve 123 to switch to the first state, simultaneously controls the electric control valve 124 to close the air inlet channel 1212, and controls the pump 112 to be turned on. Next, if the second sensor 125 sends a fully-filled signal, the controller 116 controls the pump 112 to stop. When the first sensor 115 sends an unseating signal and a user presses the teeth cleaning button 1111, the controller 116 controls the changeover valve 123 to switch to the second state, simultaneously controls the electric control valve 124 to open the air inlet channel 1212, and controls the pump 112 to be turned on; the controller 116 controls the pump 112 to be turned off when the user presses the stop button 1112.

The connecting seat 200 is provided with a liquid supply channel 210, a sensing valve 220, a wireless charging terminal 230, the projection 240, a connecting tube 250, and a power line 260.

The liquid supply channel 210 is adapted to be in communication with a liquid supply source (such as a purified water source), and is composed of a pipe in a seat body of the connecting seat 200 and a pipe in the connecting tube 250. One end of the connecting tube 250 is connected to the liquid supply source, and the other end of the connecting tube 250 is in communication with the pipe in the seat body. In the present embodiment, the liquid supply channel 210 is horizontally provided with a liquid supply port 211 on the connecting seat 200, and the liquid supply port 211 slightly protrudes from an upper surface of the connecting seat 200.

The sensing valve 220 is used for opening and closing the liquid supply channel 210. When the teeth cleaner 100 is seated, the sensing valve 220 opens the liquid supply channel 210; when the teeth cleaner 100 is unseated, the sensing valve 220 closes the liquid supply channel 210. Specifically, in the present embodiment, the sensing valve 220 includes a valve rod 221 that slides along the liquid supply port 211 and a spring 222 for driving the valve rod 221 to block the liquid supply port 211. When the teeth cleaner 100 is seated, the teeth cleaner 100 abuts against the valve rod 221, so that the valve rod 221 moves away from the liquid supply port 211; when the teeth cleaner 100 is unseated, the valve rod 221 is driven by the spring 222 to block the liquid supply port 211.

In the present embodiment, the wireless charging terminal 230 also protrudes from the upper surface of the connecting seat 200, and is electrically connected to the power supply through the power line 260. After the teeth cleaner 100 is seated, the wireless charging terminal 230 provides charging power to the rechargeable battery 114.

The projection 240 is provided at a location of the first sensor 115 when the teeth cleaner 100 is seated. The interaction between the projection 240 and the first sensor 115 has been described above, and is not described in detail herein again.

As described above, the connecting tube 250 is adapted to be connected to the teeth cleaning liquid source.

As described above, the power line 260 is adapted to be connected to the power supply.

A principle of using the teeth cleaning apparatus 1000 in the present embodiment is as follows:

When the teeth cleaner 100 is seated, the wireless charging terminal 230 charges the rechargeable battery 114, and makes the battery level indicator light 1113 change according to change of the battery level. In this case, the projection 240 abuts against the slide bar of the first sensor 115, so that the slide bar touches the trigger to send a seating signal to the controller 116. The controller 116 detects a signal of the second sensor 125, and no more action is performed if it is found that the liquid reservoir body 121 is fully filled. If it is found that the liquid reservoir body 121 is not fully filled, the controller 116 controls the changeover valve 123 to switch to the first state. At this time, the changeover valve 123 enables the outlet 1221 of the connector 122 to be in communication with the air suction port 1222 and not in communication with the liquid suction port 1223. Simultaneously, the controller 116 further controls the electric control valve 124 to close the air inlet channel 1212, and controls the pump 112 to be turned on, so that air in the liquid reservoir body 121 is sucked to the pump 112 and ejected from the ejector 113, thereby forming a negative pressure in the inner cavity of the liquid reservoir body 121. At the same time, when the teeth cleaner 100 is seated, the teeth cleaner 100 abuts against the valve rod 221 of the sensing valve 220, so that the valve rod 221 moves away from the liquid supply port 211. Therefore, the teeth cleaning liquid flows from the liquid supply port 211 to the inner cavity of the liquid reservoir body 121 through the check valve 1211. This process lasts a short period of time, and then the second sensor 125 finds that the liquid reservoir body 121 is fully filled, and sends a fully-filled signal to the controller 116. The controller 116 immediately turns off the pump 112, thereby stopping injection of the teeth cleaning liquid into the liquid reservoir body 121.

When the teeth cleaner 100 is unseated, the slide bar of the first sensor 115 no longer touches the trigger, and then sends an unseating signal to the controller 116. At this time, if the controller 116 receives a teeth cleaning instruction sent by the teeth cleaning button 1111 pressed by the user, the controller 116 controls the changeover valve 123 to switch to the second state. At this time, the changeover valve 123 enables the outlet 1221 of the connector 122 to be in communication with the liquid suction port 1223 and not in communication with the air suction port 1222. Simultaneously, the controller 116 further controls the electric control valve 124 to open the air inlet channel 1212, and controls the pump 112 to be turned on. At this time, the teeth cleaning liquid in the liquid reservoir body 121 is output to the ejector 113 through the liquid suction port 1223 and the outlet 1221 of the connector 122 and the pump 112, and is ejected from the ejector 113, so as to perform teeth cleaning. The controller 116 controls the pump 112 to be turned off when the user presses the stop button 1112.

Generally, after finishing teeth cleaning, the user connects the teeth cleaner 100 to the connecting seat 200 again, so that the teeth cleaner 100 implements liquid supplement and charging.

In addition to the implementation in the present embodiment, the teeth cleaner body 110 may also be provided with a charging terminal electrically connected to the rechargeable battery 114; the connecting seat 200 may also be provided with a power supply terminal electrically connected to the power supply. When the teeth cleaner 100 is seated, the charging terminal is electrically connected to the power supply terminal, so that the rechargeable battery 114 is charged.

In addition to the implementation in the present embodiment, the first sensor and the second sensor may also be integrally disposed on the connecting seat 200, and implemented as a pressure sensor. This helps reduce costs and the weight of the teeth cleaner. The pressure sensor is used for sensing a pressure value exerted by the teeth cleaner on the connecting seat, sending a seating signal when the pressure value is greater than or equal to a first pressure value, and sending a fully-filled signal when the pressure value is greater than or equal to a second pressure value. The first pressure value is set to be greater than zero and less than or equal to the weight of the teeth cleaner when there is no teeth cleaning liquid in the liquid reservoir, and the second pressure value is set to be the weight of the teeth cleaner when the liquid reservoir is filled up with the teeth cleaning liquid. In this case, a wireless connection relationship needs to be established between the pressure sensor and the controller 116, or the controller 116 and the pressure sensor need to be electrically connected through contact between the teeth cleaner body 110 and the connecting seat 200, so that the pressure sensor can send the seating signal and the fully-filled signal to the controller 116. This technical solution achieves advantages of lower costs and a reduced weight of the teeth cleaner 100.

In addition, it should be noted that the air inlet channel 1212 is not mandatory. Air can be imported to the inner cavity of the liquid reservoir body 121 during teeth cleaning as long as the liquid reservoir body 121 has a fit clearance in communication with air, and definitely, the effect in this case is not as good as that in the case where a specific air inlet channel is provided. It should be noted that, even if such a fit clearance exists, a negative pressure can still be created in the inner cavity of the liquid reservoir body 121 as long as an air suction capability of the pump 112 is stronger than a capability of air entering from the fit clearance into the inner cavity of the liquid reservoir body 121, so that the teeth cleaning liquid can enter the inner cavity of the liquid reservoir body 121 normally.

The electric control valve 124, the changeover valve 123, the sensing valve 116, the first sensor 115, and the second sensor 125 in the present embodiment all can be replaced with existing technologies known prior to the filing date of the present application, and such replacements should be considered as falling within the protection scope of this present application.

In the foregoing embodiment, the pump forms a negative pressure in the inner cavity of the liquid reservoir body during liquid supplement for the liquid reservoir, and the liquid supply channel of the connecting seat is in communication with the inner cavity of the liquid reservoir body through the check valve. Therefore, after the teeth cleaner is seated, the negative pressure is formed in the inner cavity of the liquid reservoir body, so that the liquid in the liquid reservoir can be supplemented, and liquid leakage can be avoided during liquid injection. On the other hand, the liquid reservoir is fixedly connected to the teeth cleaner body, and the teeth cleaning liquid in the liquid reservoir is transmitted through the pump during teeth cleaning. Therefore, the liquid reservoir does not need to be connected to a teeth cleaning liquid source through a connecting hose. Moreover, the connecting seat can be designed to be light, thereby achieving the objective of being portable.

What is claimed is:

1. A portable teeth cleaning apparatus, comprising a teeth cleaner and a connecting seat, wherein
the teeth cleaner comprises a liquid reservoir and a teeth cleaner body fixedly connected to each other;

the liquid reservoir comprises a liquid reservoir body, a connector, and a changeover valve; the liquid reservoir body is provided with a check valve, and the check valve is opened during liquid supplement for the liquid reservoir; the connector is provided with an outlet, an air suction port, and a liquid suction port, the outlet extends out of the liquid reservoir body, the air suction port is provided at an upper portion of an inner cavity of the liquid reservoir body, and the liquid suction port is provided at a lower portion of the inner cavity of the liquid reservoir body; and the changeover valve is used for enabling the outlet to be in communication with the air suction port or the liquid suction port alternatively;

the teeth cleaner body comprises a pump, an ejector, and a battery; one end of the pump is in communication with the outlet and the other end of the pump is in communication with the ejector; during teeth cleaning, the pump sucks a teeth cleaning liquid in the liquid reservoir and transmits the teeth cleaning liquid to the ejector; during liquid supplement for the liquid reservoir, the pump fon is a negative pressure in the inner cavity of the liquid reservoir body; and the battery supplies power to the changeover valve and the pump; and the connecting seat allows the teeth cleaner to be seated or unseated, and is provided with a liquid supply channel; the liquid supply channel is adapted to be in communication with a liquid supply source; and when the teeth cleaner is seated, the liquid supply channel is in communication with the inner cavity of the liquid reservoir body through the check valve.

2. The portable teeth cleaning apparatus according to claim 1, wherein the connecting seat is further provided with a sensing valve for opening and closing the liquid supply channel; when the teeth cleaner is seated, the sensing valve opens the liquid supply channel; and when the teeth cleaner is unseated, the sensing valve closes the liquid supply channel.

3. The portable teeth cleaning apparatus according to claim 2, wherein the liquid supply channel is provided with a liquid supply port; the sensing valve comprises a valve rod that slides along the liquid supply port and a spring for driving the valve rod to block the liquid supply port; when the teeth cleaner is seated, the teeth cleaner abuts against the valve rod, so that the valve rod moves away from the liquid supply port; and when the teeth cleaner is unseated, the valve rod is driven by the spring to block the liquid supply port.

4. The portable teeth cleaning apparatus according to claim 1, wherein the battery is a rechargeable battery; the teeth cleaner body is provided with a charging terminal electrically connected to the rechargeable battery; the connecting seat is provided with a power supply terminal electrically connected to a power supply; and when the teeth cleaner is seated, the charging terminal is electrically connected to the power supply.

5. The portable teeth cleaning apparatus according to claim 1, wherein the battery is a rechargeable battery; the connecting seat is provided with a wireless charging terminal connected to a power supply; and when the teeth cleaner is seated, the wireless charging terminal charges the rechargeable battery.

6. The portable teeth cleaning apparatus according to claim 1, further comprising a first sensor, a second sensor, and a controller, wherein the first sensor, disposed on the teeth cleaner body, and is used for sensing seating or unseating of the teeth cleaner and sending a sensing result to the controller;

the second sensor, disposed on the liquid reservoir, and is used for sensing whether the liquid reservoir body is filled up with the teeth cleaning liquid and sending a sensing result to the controller;

the controller controls the changeover valve to communicate the outlet of the connector with the air suction port and controls the pump to be turned on when the teeth cleaner is seated and the liquid reservoir body is not fully filled, and after the liquid reservoir body is fully filled, the controller controls the pump to be turned off; the controller further controls the changeover valve to communicate the outlet of the connector with the liquid suction port and controls the pump to be turned on when the teeth cleaner is unseated and enters a teeth cleaning mode; the controller is disposed on the teeth cleaner body and is electrically connected to the battery.

7. The portable teeth cleaning apparatus according to claim 2, further comprising a first sensor, a second sensor, and a controller, wherein the first sensor, disposed on the teeth cleaner body, and is used for sensing seating or unseating of the teeth cleaner and sending a sensing result to the controller;

the second sensor, disposed on the liquid reservoir, and is used for sensing whether the liquid reservoir body is filled up with the teeth cleaning liquid and sending a sensing result to the controller;

the controller controls the changeover valve to communicate the outlet of the connector with the air suction port and controls the pump to be turned on when the teeth cleaner is seated and the liquid reservoir body is not fully filled, and after the liquid reservoir body is fully filled, the controller controls the pump to be turned off; the controller further controls the changeover valve to communicate the outlet of the connector with the liquid suction port and controls the pump to be turned on when the teeth cleaner is unseated and enters a teeth cleaning mode; the controller is disposed on the teeth cleaner body and is electrically connected to the battery.

8. The portable teeth cleaning apparatus according to claim 3, further comprising a first sensor, a second sensor, and a controller, wherein the first sensor, disposed on the teeth cleaner body, and is used for sensing seating or unseating of the teeth cleaner and sending a sensing result to the controller;

the second sensor, disposed on the liquid reservoir, and is used for sensing whether the liquid reservoir body is filled up with the teeth cleaning liquid and sending a sensing result to the controller;

the controller controls the changeover valve to communicate the outlet of the connector with the air suction port and controls the pump to be turned on when the teeth cleaner is seated and the liquid reservoir body is not fully filled, and after the liquid reservoir body is fully filled, the controller controls the pump to be turned off; the controller further controls the changeover valve to communicate the outlet of the connector with the liquid suction port and controls the pump to be turned on when the teeth cleaner is unseated and enters a teeth cleaning mode; the controller is disposed on the teeth cleaner body and is electrically connected to the battery.

9. The portable teeth cleaning apparatus according to claim 4, further comprising a first sensor, a second sensor, and a controller, wherein the first sensor, disposed on the teeth cleaner body, and is used for sensing seating or unseating of the teeth cleaner and sending a sensing result to the controller;

the second sensor, disposed on the liquid reservoir, and is used for sensing whether the liquid reservoir body is filled up with the teeth cleaning liquid and sending a sensing result to the controller;

the controller controls the changeover valve to communicate the outlet of the connector with the air suction port and controls the pump to be turned on when the teeth cleaner is seated and the liquid reservoir body is not fully filled, and after the liquid reservoir body is fully filled, the controller controls the pump to be turned off; the controller further controls the changeover valve to communicate the outlet of the connector with the liquid suction port and controls the pump to be turned on when the teeth cleaner is unseated and enters a teeth cleaning mode; the controller is disposed on the teeth cleaner body and is electrically connected to the battery.

10. The portable teeth cleaning apparatus according to claim 5, further comprising a first sensor, a second sensor, and a controller, wherein the first sensor, disposed on the teeth cleaner body, and is used for sensing seating or unseating of the teeth cleaner and sending a sensing result to the controller;

the second sensor, disposed on the liquid reservoir, and is used for sensing whether the liquid reservoir body is filled up with the teeth cleaning liquid and sending a sensing result to the controller;

the controller controls the changeover valve to communicate the outlet of the connector with the air suction port and controls the pump to be turned on when the teeth cleaner is seated and the liquid reservoir body is not fully filled, and after the liquid reservoir body is fully filled, the controller controls the pump to be turned off; the controller further controls the changeover valve to communicate the outlet of the connector with the liquid suction port and controls the pump to be turned on when the teeth cleaner is unseated and enters a teeth cleaning mode; the controller is disposed on the teeth cleaner body and is electrically connected to the battery.

11. The portable teeth cleaning apparatus according to claim 6, wherein the first sensor is a limit switch disposed on the teeth cleaner body; the limit switch comprises a slide bar and a trigger; when the teeth cleaner is seated, the connecting seat abuts against the slide bar so that the slide bar touches the trigger to send a seating signal; and when the teeth cleaner is unseated, the slide bar leaves the trigger to send an unseating signal.

12. The portable teeth cleaning apparatus according to claim 6, wherein the second sensor is a liquid level sensor disposed on the liquid reservoir; and the liquid level sensor is attached to an external sidewall of the liquid reservoir body or is disposed in the inner cavity of the liquid reservoir body.

13. The portable teeth cleaning apparatus according to claim 6, wherein the liquid reservoir further comprises an electric control valve; an upper portion of the liquid reservoir body is further provided with an air inlet channel; the electric control valve is used for opening and closing the air inlet channel; the electric control valve is electrically connected to the controller; when the controller controls the changeover valve to communicate the outlet of the connector with the liquid suction port, the controller controls, in a linkage manner, the electric control valve to open the air inlet channel; and when the controller controls the changeover valve to communicate the outlet of the connector with the air suction port, the controller controls, in a linkage manner, the electric control valve to close the air inlet channel.

* * * * *